United States Patent Office 3,017,406
Patented Jan. 16, 1962

3,017,406
MANUFACTURE OF AZO COMPOUNDS
Louis Mehr, Belleville, N.J., assignor to Wallace & Tiernan Inc., Belleville, N.J., a corporation of Delaware
No Drawing. Filed Jan. 5, 1959, Ser. No. 784,863
9 Claims. (Cl. 260—192)

This invention relates to the manufacture of azo compounds, and is directed to a specific class of new compounds of such type, and also, very significantly, to new and improved procedure for making azo compounds, both those of the novel class and various azo compounds of known character (for example azobisformamide), by oxidizing the corresponding hydrazo compounds.

More specifically, the novel procedure is concerned with operations for oxidizing hydrazo compounds of the type

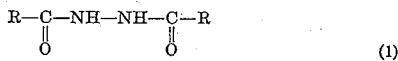  (1)

to the corresponding azo compounds

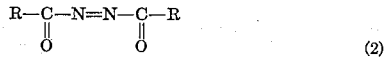  (2)

where the groups R are of a specific character as defined below.

Various procedures are known for making the stated hydrazo compounds, and since details of such operations form no part of the present invention, it is deemed unnecessary to describe them at length. It may be mentioned, however, that a common process involves reacting a chloroformate

  (3)

with hydrazine to yield hydrazodicarbonic esters of the formula:

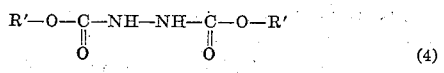  (4)

Although compounds of Formula 4 are within the class to which the new process applies, such compounds can alternatively first be reacted, for example, with an amine (R''—NH—R''') to produce the corresponding derivative of hydrazodicarbonamide (also known as hydrazo bisformamide) having the formula:

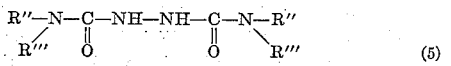  (5)

In the specific instance where the group R in Formulas 1 and 2 is to be NH₂, the compound of Formula 4 may be reacted with ammonia to yield the compound of Formula 5 where both R'' and R''' are hydrogen. The last-mentioned compound is thus the specific instance of Formula 1 where R is NH₂, being hydrazodicarbonamide (or hydrazo bisformamide). An alternative procedure for preparing the last-mentioned compound is by the direct reaction of hydrazine with urea.

As indicated above, it is possible and often convenient to prepare simply the compound of Formula 4, for example where R' is an ethyl group, it being seen that such substance is in effect a compound of the type of Formula 1 wherein R is $C_2H_5$—O. Thus compounds of the class of Formula 4 come within the scope of the process of the present invention, being hydrazo compounds which can be oxidized to corresponding azo compounds, such as the ethyl azodicarbonic ester.

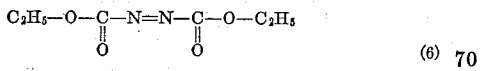  (6)

It will be understood that following the oxidation step according to the invention, the last-mentioned ester, such as indicated in Formula 6, may thereafter be reacted with any desired amine to yield various substituted amides.

A commonly used and well known method heretofore employed for oxidizing some hydrazo compounds to produce corresponding azo compounds has involved the use of potassium dichromate or permanganate in sulfuric acid solution. Such operation is relatively expensive because of the dichromate or permanganate. As will be explained below, the present process is considerably less costly and is more rapid and convenient.

More specifically, the present procedure is concerned with oxidation, to produce the corresponding azo compounds (Formula 2), of hydrazo compounds as defined in Formula 1 where both constituents R are identical and where R is selected from the class consisting of O—R' and R''—N—R''', R' being selected from the class consisting of alkyl groups containing from 1 to 18 carbon atoms and cycloalkyl groups containing from 4 to 7 carbon atoms, and each of R'' and R''' being selected from the class consisting of hydrogen, alkyl groups containing from 1 to 18 carbon atoms, cycloalkyl groups containing from 4 to 7 carbon atoms, unsubstituted aryl groups (e.g. phenyl, naphthyl), and aralkyl groups containing a total of 7 to 18 carbon atoms (all references herein to numerical ranges, as of numbers of carbon atoms, being inclusive of the stated limits). An aralkyl group is here specifically defined as a radical consisting of a phenyl group and an alkyl group, wherein the attachment or linkage between such aralkyl group and nitrogen (e.g. in Formula 5) may be through any one of the carbon atoms in the phenyl group or the alkyl group; examples of such aralkyl groups are benzyl and tolyl. As will now be appreciated, the definition of R in the resulting azo compound is exactly the same as stated above for the hydrazo compound to which the process is applied. These azo compounds have inherent utility for various purposes as set forth below and may be useful as intermediates for the production of other useful compounds, for example, as in the case explained above where the ethyl azodicarbonic ester (Formula 6) is converted to a substituted amide.

The improved process of the present invention essentially comprises dissolving or suspending the hydrazo compound, of the defined class, in acetic acid, and then with a nitrate present in the solution, heating the mixture to accomplish the desired oxidizing reaction. That is to say, it has now been discovered that the oxidation of the hydrazo compound to the desired azo compound can be rapidly effectuated by the defined method, i.e. by treating the hydrazo compound with nitrate while in dispersion in acetic acid, with appropriate heating and preferably with the aid of a metallic catalyst, for example in very minor amount. It will be understood that although the hydrazo compound is in many cases such as to be dissolved in the acid, effective results are obtainable with the hydrazo compound in suspended rather than dissolved state; references herein to dispersion in the acid are therefore intended generically to mean either solution or suspension.

More specifically, the new procedure, in an effective practical embodiment, consists in dispersing the hydrazo compound in acetic acid, very advantageously glacial acetic acid, then adding a nitrate, and heating the mixture to effectuate the desired oxidation, a trace of a metallic catalyst being also preferably added to enhance the yield and shorten the reaction time. This process is materially less expensive than the prior method employing dichromate or permanganate, and it is also in general more rapid, while at the same time being relatively simple to carry out, with satisfactory yield of the desired product.

Considerable variation in the nature or quantity of the substances used, may be made. Thus the quantity of acetic acid must be sufficient to keep the mass fluid, but this requirement appears to be the chief critical limitation in such respect. As will be appreciated, considerations of economy will ordinarily dictate the avoidance of large excesses of acetic acid, e.g. beyond that necessary to maintain a desirable and preferably quite free fluidity of the mass. A special feature of the invention, for attainment of unusually satisfactory results, is the use of glacial acetic acid, but in at least many cases, some water in the acid may be tolerated without undue diminution of yield. For example, acid of concentration down to 95% affords good results, and acid of concentration as low as 80% may be used, with at least fair results, in certain cases.

Among nitrates, ammonium nitrate is at present preferred, although reasonably good results are obtained with alkali metal nitrates such as those of sodium, potassium and lithium. It is also possible to employ alkaline earth nitrates, for example calcium nitrate or barium nitrate. In point of quantity, at least one mol of nitrate per mol of hydrazo compound should be employed in order to avoid deliberate loss of some of the latter substance, which is the most expensive ingredient in the reacting mixture. That is to say, with lower quantities of nitrate, there will be corresponding failure of reaction of part of the hydrazo compound. By preference, about 1.3 mols of nitrate per mol of hydrazo are employed so that, as a matter of practical operation, the loss of this expensive starting material (e.g. the hydrazo compound) will be minimized. In general, about 3 mols of nitrate per mol of hydrazo represents the practical maximum for such reagent.

The reaction is very substantially promoted by the use of a small quantity of a metallic catalyst, i.e. such as to provide ions of a suitable metal. Copper acetate appears particularly preferable as a source of such ions. Various metallic catalysts may be employed, however, being particularly any convenient source of ions of one or more of the metals copper, cobalt, nickel, iron and manganese, it being presently understood that such source may provide the ions in any of the usual states, for example in the case of iron being either a ferrous or ferric compound. Substances especially appropriate as catalysts, i.e. constituting sources of such ions, are salts, viz. acetates, nitrates, sulfates and chlorides of the metals named above; alternatively the metal may be introduced in another form, such as the oxide. In general, the catalyst is conveniently employed in the ratio (by weight) of about 0.1 part of the selected compound to 5 parts of the nitrate employed for reaction. While the amount of catalyst does not seem to be greatly critical, quantities substantially less than as just stated are not in general sufficiently effective to warrant their use, while any large excess over the above proportion or over what might otherwise be found necessary by simple test, would be uneconomical.

As has been indicated, the process is applicable to a relatively large variety of hydrazo compounds, as within the class defined by the above recital of the characteristics of R in Formula 2. In addition to the substances named in the procedural examples below, other examples of hydrazo compounds, which can be treated in accordance with the invention to produce corresponding azo compounds are: (a) hydrazo bisformamides where one of R″ and R‴ is hydrogen and the other is selected as stated above, e.g. 1,6-di-n-dodecyl hydrazo bisformamide, 1,6-dicyclohexyl hydrazo bisformamide, 1,6-dinaphthyl hydrazo bisformamide, 1,6-ditolyl hydrazo bisformamide (being either di-o-, di-m-, or di-p-tolyl); (b) compounds where R″ and R‴ are the same, e.g. 1,1,6,6-tetramethyl hydrazo bisformamide, 1,1,6,6-tetra cyclohexyl hydrazo bisformamide, 1,1,6,6-tetraphenyl hydrazo bisformamide; (c) compounds where R″ and R‴ are different groups, other than hydrogen, e.g. 1,6-dimethyl 1,6-diphenyl hydrazo bisformamide, 1,6-dimethyl 1,6-dibenzyl hydrazo bisformamide; and (b) compounds of the type of Formula 4 above, being esters of hydrazo diformic acid, e.g. di-n- amyl ester, dimethyl ester, di-n-decyl ester, dicyclohexyl ester, dicyclopentyl ester.

It will be understood that the new process is applicable to mixtures of hydrazo compounds, as well as to single substances, and to substances of various degrees of purity. For instance, compounds of the type of Formula 5 above, suitable for the process, may be prepared by using commercially available amines, which may be nominally identified as containing a given, specific alkyl group, but which may also include very minor amounts of amines of higher and lower alkyls, which produce like small quantities of corresponding hydrazo bisformamides, also converted to azo compounds in the new procedure. Utility is also indicated for the treatment of mixtures derived from more broadly mixed amines. For example, by using a commercial primary amine mixture called Armeen SD, understood to consist of 20% hexadecyl, 17% octadecyl, 26% octadecenyl and 37% octadecadienyl amines, a mixture of corresponding hydrazo bisformamides may be prepared, which can be subjected to the present procedure to yield a similar mixture of azo compounds. Another mixture of hydrazo compounds, likewise susceptible of conversion to azo compounds by the process, can be derived from a primary amine mixture named Armeen CD, said to contain octyl, decyl, dodecyl, tetradecyl, hexadecyl, octadecyl and octadecenyl amines.

In practice, the new process is performed by heating the dispersion of the selected hydrazo compound (or mixture of such compounds), with the nitrate and preferably the catalyst, dispersed therein. In general, the order of addition of the substances does not seem critical, the requirement being establishment of a dispersion of the hydrazo compound in acetic acid, the mixture also containing the nitrate and catalyst. The reaction mixture is heated to effectuate the desired oxidation, such heating being preferably to reflux. In some cases, however, as may be readily determined by simple test, the compounds cannot stand the reflux, and in consequence, the heating should be effected at lower temperatures, e.g. down to 70° C. Examples of such compounds are certain aromatic derivatives (as in the case of Example 4 below), which tend to decompose at the higher temperatures. In many cases, particularly those to which the process is most appropriate, a heating period of 5 to 10 minutes is sufficient. Longer periods may be employed where necessary; for obvious economic reasons, the heating should be continued no longer than is required.

Whereas a number of the azo compounds produced in accordance with the described process are known (notable examples being azobisformamide and the compounds wherein one of R″ and R‴ is hydrogen and the other is methyl, ethyl or phenyl), the products of the stated class are in many cases new compounds. It has been found that a specific group or class of such new compounds has unusual properties, thus representing distinctly new and improved substances to which the invention is correspondingly directed. These new compounds of the invention have various uses, for example, as lubricant additives, as polymerization initiators, as cross-linking agents (e.g. in various organic syntheses) and as blowing agents for plastic foams.

For most or all of the above purposes a high degree of solubility in organic systems as well as in oils is highly desirable and indeed in a number of instances, quite necessary. The new compounds of the invention, as distinguished from the methyl and ethyl derivatives, have special or additional value as exhibiting a high order of such solubility.

More specifically, the new compounds having such properties can be defined as a series of azo compounds represented by the following formula:

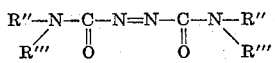

which is derived from Formula 5 above (by the present process), wherein one of R" and R'" is an alkyl group and the other of R" and R'" is selected from the class consisting of hydrogen and alkyl groups; the first of R" and R'" being an alkyl group containing from 10 to 18 carbon atoms when the second of R" and R'" is hydrogen, and the total of carbon atoms in all of the groups R" and R'" together being then from 20 to 36; and R" and R'" being identical with each other and being each an alkyl group containing from 5 to 10 carbon atoms when both of R" and R'" are alkyl groups, and the total of carbon atoms in all of the groups R" and R'" together being then from 20 to 40. Stated in another way, the new compounds of the invention have the composition of Formula 7 above, with both constituents R" identical and both constituents R'" identical and with R" and R'" selected as stated above, specifically in such manner that when one of said constituents is hydrogen the total number of carbon atoms in the compound is from 22 to 38 inclusive, and when both constituents are alkyl they are the same and the total number of carbon atoms in the compound is from 22 to 42 inclusvie. Particularly valuable members of the series are those compounds where one of R" and R'" is hydrogen, for instance as in the new compound 1,6-di-n-decyl azobisformamide, which is the product of Example 3 below. Other examples are 1,6-di-n-dodecyl azobisformamide, and 1,6-di-n-octadecyl azobisformamide.

The following are specific examples of the process of the invention, including an example of production of one of the new compounds. In all cases percentages and parts are given by weight.

EXAMPLE 1

*Synthesis of azobisformamide*

A 200 cc. 3-necked, round-bottomed flask fitted with an efficient stirrer and reflux condenser was charged with 5 to 6 parts of hydrazodicarbonamide, 5 parts of ammonium nitrate, 0.1 part of cupric acetate monohydrate and 50 parts of glacial acetic acid. The mixture was brought to reflux, while stirring, and maintained so for 10 minutes. The fumes of nitrogen peroxide that formed were vented. The flask was allowed to cool to about 45° C. and the product was filtered, washed with water and dried. The yield was 86 to 90% and assayed by iodometric titration as 98% azodicarbonamide.

EXAMPLE 2

*Synthesis of azodiformic acid diethylester*

The 200 cc. flask was charged with 6.9 parts of ethylhydrazodicarboxylate, 5 parts of ammonium nitrate, 0.1 part of cupric acetate monohydrate and 50 parts of glacial acetic acid. The mixture was refluxed for 10 minutes, while stirring, and then poured into 200–300 cc. of water. The red-orange oil, which constituted the product, was extracted with benzene. The benzene extract was dried over anhydrous sodium sulfate, and thereafter the benzene distilled off, leaving the synthesized product as named above. The yield was 57%.

EXAMPLE 3

*Synthesis of 1,6-di-n-decyl azobisformamide*

The 200 cc. flask was charged with 6 parts of 1,6-di-n-decyl hydrazodicarbonamide, 70 parts of glacial acetic acid, 1.33 parts of ammonium nitrate, 0.1 part of cupric acetate monohydrate, and the mixture was brought to incipient boiling, with stirring. After a few moments, an additional 1.3 parts of ammonium nitrate was added and the mixture was refluxed for 10 minutes whereupon it was cooled and diluted with 100 parts of water, filtered and washed with water. The yield was 97%. The product was finally recrystallized from ethanol. This synthesized product, as named above, is a new compound, within the specific class of such compounds defined herein as having new and valuable properties. As indicated, the product of this example was found to have a high order of oil solubility, for instance in petroleum-source oils, such as would be the base of steam turbine oil formulations. This oil solubility renders the compound particularly suitable for use in such formulations or the like, for instance as a lubricant additive for the purpose of inhibiting the corrosion of metal parts.

The recrystallized product was found to decompose at 144°–146° C. to a red, frothy, waxy mass.

EXAMPLE 4

*Synthesis of 1,6-di-phenyl azobisformamide*

A 125 cc. flask was charged with ½ part of finely-ground 1,6-di-phenyl-hydrazodicarbonamide, which was there dispersed in 25 parts of glacial acetic acid containing 2 parts of ammonium nitrate and 0.05 part of cupric acetate monohydrate. The reaction flask was warmed to 70° C. and maintained so for approximately 5 minutes during which time the starting material was completely converted to the orange product. The flask was cooled and the product, being the synthesized compound as named above, was filtered off and recrystallized twice from acetone, M.P. 176°–178° (melts with decomposition). The yield was 60%.

It has been found that the process is susceptible of special economy in that the acetic acid can be readily reused, and to a considerable extent reused without adding further catalyst. Thus after filtering off the product azo compound, the resulting mother liquor can simply be used again, indeed several times, by dissolving more of the hydrazo compound and proceeding with further addition of nitrate and heating for reaction. For several repetitions of use in this way, the original quantity of metallic catalyst has been found to suffice; no additions are ordinarily needed. If greater economy is required, after the mother liquor has been reused several times as above, it can be distilled, to obtain a recovery of about 95% of the acetic acid, which can then be employed as the equivalent of fresh acid. Hence the process is extremely economical in respect to the acetic acid (which may be required in relatively considerable amount), in its function as solvent for the hydrazo compound during the reaction.

It is to be understood that the invention is not limited to the operations hereinabove specifically described, but may be carried out in other ways without departure from its spirit.

I claim:

1. A process for oxidizing a hydrazo compound having the formula

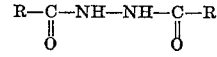

to produce the corresponding azo compound having the formula

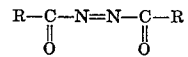

wherein both constituents R in each formula are identical and wherein R is selected from the class consisting of O—R' and R"—N—R'", R' being selected from the class consisting of alkyl groups containing from 1 to 18 carbon atoms and cycloalkyl groups containing from 4 to 7 carbon atoms, and each of R" and R'" being selected from the class consisting of hydrogen, alkyl groups containing from 1 to 18 carbon atoms, cycloalkyl groups containing from 4 to 7 carbon atoms, unsubstituted aryl radicals selected from the group consisting of phenyl and naphthyl radicals, and aralkyl groups selected from the group consisting of benzyl and tolyl radicals, comprising reacting the hydrazo compound with an inorganic nitrate while maintaining said hydrazo compound dispersed in acetic acid having a concentration of at least 80%.

2. A process as defined in claim 1, which comprises heating a dispersion of the hydrazo compound in acetic acid containing a nitrate selected from the class consisting of ammonium, alkali and alkaline-earth nitrates.

3. A process as defined in claim 1, in which the acetic acid is glacial acetic acid.

4. A process as defined in claim 1, in which the acetic acid dispersion contains a metallic catalyst for promoting oxidation of the hydrazo compound to the azo compound, said metallic catalyst comprsing a source of metal ions selected from the class consisting of copper, cobalt, nickel, iron and manganese.

5. A process as defined in claim 1, which comprises reacting the hydrazo compound in dispersion in acetic acid with a nitrate selected from the class consisting of ammonium, alkali and alkaline-earth nitrates, in the presence of a metallic catalyst comprising a source of metal ions selected from the class consisting of copper, cobalt, nickel, iron and manganese.

6. A process as defined in claim 1, which comprises heating a dispersion of the hydrazo compound in glacial acetic acid containing a nitrate selected from the class consisting of ammonium, alkali and alkaline-earth nitrates, and containing a metallic catalyst comprising a source of metal ions selected from the class consisting of copper, cobalt, nickel, iron and manganese.

7. A process as defined in claim 1, which comprises heating a dispersion of the hydrazo compound in glacial acetic acid containing a nitrate in the amount of about 1 to 3 mols per mol of hydrazo compound and containing a metallic catalyst in proportion, by weight, of at least about 0.1 part of catalyst to 5 parts of the nitrate, said nitrate being selected from the class consisting of ammonium, alkali and alkaline-earth nitrates and said catalyst comprising a source of metal ions selected from the class consisting of copper, cobalt, nickel, iron and manganese.

8. A process as defined in claim 1, which comprises heating a dispersion of the hydrazo compound in glacial acetic acid containing ammonium nitrate in the amount of about 1.3 to 3 mols per mol of hydrazo compound and containing copper acetate as a metallic catalyst in the proportion, by weight, of about 0.1 part to 5 parts of said ammonium nitrate.

9. A process in accordance with claim 1 wherein said hydrazo compound is hydrazodicarbonamide, said resulting produced corresponding azo compound being azodicarbonamide.

References Cited in the file of this patent
UNITED STATES PATENTS 2,554,141    Flory et al. _____ May 22, 1951

OTHER REFERENCES

B.I.O.S., Final Report, vol. 1150, No. 22, pp. 21–23.
Sidgwick: "Organic Chemistry of Nitrogen," p. 433 (1949).
Saunders: "The Aromatic Diazo Compounds," pp. 18 and 19 (1949).